United States Patent Office 2,745,757
Patented May 15, 1956

2,745,757
OPTICAL GLASS

Walter Geffcken, Landshut, Germany, assignor to Jenaer Glaswerk Schott & Gen., Mainz, Germany No Drawing. Application August 3, 1953,
Serial No. 372,155

Claims priority, application Germany August 8, 1952

2 Claims. (Cl. 106—54)

The subject matter of my copending application, Ser. No. 352,992, filed May 4, 1953, is relative to optical glasses which with reference to the $n_d$-value possess especially high values in Abbe-number $\nu$, and which are free from thorium oxide and free from beryllium oxide. These glasses substantially consist of boron-oxide ($B_2O_3$), lanthanum oxide ($La_2O_3$), zirconium oxide ($ZrO_2$) and calcium oxide (CaO). These glasses, as shown in my copending application, may also contain additions as well known in the melting of glasses, e. g. of aluminum oxide, silica, indium oxide, germanium oxide, tungsten oxide, etc. up to totally 4%. It has been found that those glasses do not possess in all cases a completely satisfactory resistivity against surface weathering. According to the present invention there results a considerable improvement if an addition of silica is added to the glass instead of part of the boron oxide to an extent exceeding the given charge of 4%. Contrary to expectation such a higher addition of silica has no influence upon the optical data of the glass provided the content of boron oxide does not fall below about 40% and at least not below the lower limit of 36% given in my copending application. In this way it is possible to add up to 7% of silica to the glasses according to Examples 3 and 4 of the table at the end of my copending application without danger that thereby the $\nu$-value is considerably altered. In case the content of silica is increased up to 10%, then the $\nu$-value will be somewhat reduced but only to such an extent that the glass can still be considered as being very valuable. The $n_d$-value thereof remains unaltered. It is considerably favorable to add to the glass a content of silica between 4 and 7%. In addition to the improvement in chemical resistivity, the increased content of silica has the advantage that the glass has greater ductility. Moreover, the necessary content of zirconium can be added in the form of the considerably inexpensive zirconium silicate which is available on the market with very good purity.

The following table shows five examples of glasses composed in accordance with my invention with their figures of composition and optical properties. The percentage figures are likewise relative to synthesis as in my copending application.

|   | $B_2O_3$ | $SiO_2$ | $ZrO_2$ | $La_2O_3$ | CaO | $n_d$ | $\nu$ |
|---|---|---|---|---|---|---|---|
| 1 | 41.0 | 6.0 | 6.0 | 30.0 | 17.0 | 1.688 | 55.3 |
| 2 | 39.0 | 8.0 | 6.0 | 30.0 | 17.0 | 1.688 | 54.9 |
| 3 | 37.0 | 10.0 | 6.0 | 30.0 | 17.0 | 1.688 | 54.4 |
| 4 | 43.5 | 4.0 | 1.9 | 43.4 | 7.2 | 1.689 | 55.9 |
| 5 | 39.0 | 6.0 | 6.0 | 36.0 | 13.0 | 1.700 | 54.8 |

I claim:

1. A thorium oxide, beryllium oxide free optical glass with a high refractive index consisting of: (a) at least 36 weight per cent boron oxide; (b) 26–44 weight per cent lanthanum oxide; (c) 5–19 weight per cent calcium oxide; (d) 0–11 weight per cent zirconium oxide; (e) 0–6 weight per cent of a bivalent basic component other than calcium oxide; (f) 0–9 weight per cent of a member selected from the group consisting of niobium oxide, tantalum oxide and mixtures thereof; (g) 0–2 weight per cent lithium oxide; (h) 0–4 weight per cent of compatible glass components; (i) Above 4 to 10 weight per cent silica; the total amounts of (a) and (i) not exceeding 50 weight per cent, the amounts of (c), (e) and (g) not exceeding a total of 19 weight per cent, the sum of (c), (e) and 2(g) not exceeding the value of 33 weight per cent minus one-half (b).

2. Optical glass according to claim 1, in which (i) is present in amount between above 4 to 7 weight per cent.

References Cited in the file of this patent

UNITED STATES PATENTS

| 2,241,249 | Eberlin et al. | May 6, 1941 |
| 2,584,975 | Armistead | Feb. 12, 1952 |